ly available at the time the serving node attaches to the terminal. Therefore, as part of the "Attach" procedure, the terminal must identify itself to the network.

United States Patent
Verma et al.

(10) Patent No.: US 7,215,943 B2
(45) Date of Patent: May 8, 2007

(54) MOBILE TERMINAL IDENTITY PROTECTION THROUGH HOME LOCATION REGISTER MODIFICATION

(75) Inventors: Shaily Verma, Mumbai (IN); Charles Chuanming Wang, Beijing (CN); Junbiao Zhang, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/524,177

(22) PCT Filed: Aug. 11, 2003

(86) PCT No.: PCT/US03/25131

§ 371 (c)(1),
(2), (4) Date: Jan. 20, 2006

(87) PCT Pub. No.: WO2004/015968

PCT Pub. Date: Feb. 19, 2004

(65) Prior Publication Data

US 2006/0116122 A1    Jun. 1, 2006

Related U.S. Application Data

(60) Provisional application No. 60/403,158, filed on Aug. 13, 2002.

(51) Int. Cl.
*H04Q 7/20* (2006.01)

(52) U.S. Cl. .................... 455/410; 455/411; 455/435.1

(58) Field of Classification Search ................ 455/410, 455/411, 435.1, 435.2, 432.1, 432.2, 433, 455/434, 436, 422.1
See application file for complete search history.

(56) References Cited

U.S. PATENT DOCUMENTS

| 5,375,251 | A | * | 12/1994 | Pfundstein | .................. 455/551 |
| 5,713,073 | A | * | 1/1998 | Warsta | ....................... 455/524 |
| 5,920,814 | A | * | 7/1999 | Sawyer et al. | ........... 455/422.1 |
| 6,070,070 | A | * | 5/2000 | Ladue | ........................ 455/419 |
| 6,167,279 | A | | 12/2000 | Chang et al. | |
| 6,195,550 | B1 | | 2/2001 | Sollee et al. | |

(Continued)

FOREIGN PATENT DOCUMENTS

| EP | 0 838 967 | 4/1998 |
| WO | WO 97/09837 | 3/1997 |

OTHER PUBLICATIONS

Search Report Dated Nov. 20, 2003.

(Continued)

*Primary Examiner*—Joseph Feild
*Assistant Examiner*—Huy D Nguyen
(74) *Attorney, Agent, or Firm*—Joseph J. Laks; Robert B Levy

(57) ABSTRACT

Secure access by a mobile wireless terminal of a wireless telephony network is achieved by having a Home Location Register store the terminal's temporary and permanent identities. Upon accessing the network following initial registration, the terminal sends a temporary identity to a Serving GPRS Support Node (SGSN). If no serving node in the network knows the terminal, the terminal need not sent its permanent identity in clear as was previously required. Rather, the serving node need only query the HLR since the HLR can map the terminal's temporary identity to its permanent identity. In this way, the permanent identity of the mobile wireless terminal remains secure.

14 Claims, 3 Drawing Sheets

U.S. PATENT DOCUMENTS

| | | | |
|---|---|---|---|
| 6,553,227 B1* | 4/2003 | Ho et al. | 455/433 |
| 6,665,529 B1* | 12/2003 | Mills, Jr. | 455/411 |
| 6,690,798 B1* | 2/2004 | Dent | 380/248 |
| 6,810,250 B2* | 10/2004 | Jo et al. | 455/433 |
| 6,853,851 B1* | 2/2005 | Rautiola et al. | 455/553.1 |
| 2002/0061746 A1* | 5/2002 | Jo et al. | 455/433 |
| 2003/0112976 A1* | 6/2003 | Quick et al. | 380/270 |

OTHER PUBLICATIONS

Christoph Stepping, "Integration of Security Aspects in UMTS and BRAN", 6th World Multiconference on Systemics, Cybernetics and Informatics, vol. 4, Jul. 14, 2002-Jul. 18, 2002, pp. 197-202, XP008062983.

Supplementary European Search Report Completed: Apr. 18, 2006.

* cited by examiner

US 7,215,943 B2

MOBILE TERMINAL IDENTITY PROTECTION THROUGH HOME LOCATION REGISTER MODIFICATION

This application claims the benefit, under 35 U.S.C. § 365 of International Application PCT/US03/25131, filed Aug. 11, 2003, which was published in accordance with PCT Article 21(2) on Feb. 19, 2004 in English and which claims the benefit of U.S. Provisional patent application No. 60/403,158, filed Aug. 13, 2002.

TECHNICAL FIELD

This invention relates to a technique for protecting the identity of a mobile wireless terminal when accessing a wireless telephony network.

BACKGROUND ART

Presently, users seeking wireless telephony service typically subscribe to one of many providers of such service. Today's wireless telephony service providers not only offer voice calling but also offer General Packet Radio Service (GPRS) to enable the exchange data packets via a mobile wireless terminal. While GPRS exists in many areas, data transmission rates typically do not exceed 56 Kbs and the cost to wireless network service providers to support this service remain high, making GPRS expensive. To provide enhanced data communications, efforts now exist to establish new standards for wireless telephony. One such effort is the proposed "Universal Mobile Telecommunications System (UMTS)" standard specified by the 3rd Generation Partnership Project (3GPP) for advanced packet radio service in wireless telephony networks. The UMTS standard proposes transmission rates as high as 2 Mbps, making such service more attractive to subscribers.

In accordance with the UMTS standard, a subscriber's mobile wireless terminal will transmit its permanent identity, typically referred to as an International Mobile Station Identity or IMSI, to the network upon initial registration. To maintain user identity confidentiality and untraceability, after initial registration, each subscriber receives from the wireless network a temporary identity called Packet Temporary Mobile Subscriber Identity (P-TMSI) kept in a Serving GPRS Support Node (SGSN) in the network. Upon each subsequent access of the wireless network, the mobile wireless terminal will send its P-TMSI. The SGSN serving that mobile wireless terminal maps the P-TMSI to the user's permanent identity (i.e., IMSI). In this way, the user avoids transmitting its IMSI. To reduce the risk of breaching the user's confidentiality, the network should not identify the user for a long period by means of the same P-TMSI. Rather, the wireless telephony network should assign a new P-TMSI after some extended interval.

Despite efforts to protect the user's confidentiality via the P-TMSI, circumstances exist in present day wireless telephony networks that require the mobile wireless terminal to transmit its permanent identity (IMSI) after registration. For example, upon a new attachment to the wireless telephony network, the mobile wireless terminal could encounter an SGSN different than the one that served the terminal prior to detachment. Upon such a new attachment, the mobile wireless terminal will send its P-TMSI to the new SGSN. In turn, the new SGSN sends an Identification Request message to the old SGSN. If both the old and new SGSNs lack knowledge of the mobile wireless terminal, the new SGSN will send an Identity Request message to the terminal. The mobile wireless terminal must respond with is permanent Identity (IMSI) in clear text, breaching the confidentiality of the user's identity Thus, there is need for a technique for protecting the user's identity during attachment to a wireless telephony network.

BRIEF SUMMARY OF THE INVENTION

Briefly, in accordance with a preferred embodiment of the present principles, there is provided a method for enabling a mobile wireless terminal to securely access a wireless network, such as a wireless telephony network. The method commences upon receipt in the network of an access request from a mobile wireless terminal that had previously registered with the network. Thus, the access request made by the mobile wireless terminal will contain a temporary identity assigned to the terminal during each attach procedure. Upon receipt of the identity request, a query is launched to at least one serving node in the wireless network to identify the terminal. If no serving node in the wireless network recognizes the mobile wireless network, then a query is launched to a register (e.g., a Home Location Register), which stores the identity of each registered mobile wireless terminal previously attached to the network. In response, the register sends an identification response to the querying serving node to enable authentication of the user.

Maintaining mobile wireless terminal temporary identity information in the Home Location Register enables a serving node that does not recognize the terminal to query the register. In this way, the mobile wireless terminal need not send its permanent identity when unrecognised by the serving node.

DETAILED DESCRIPTION

Figure 1:
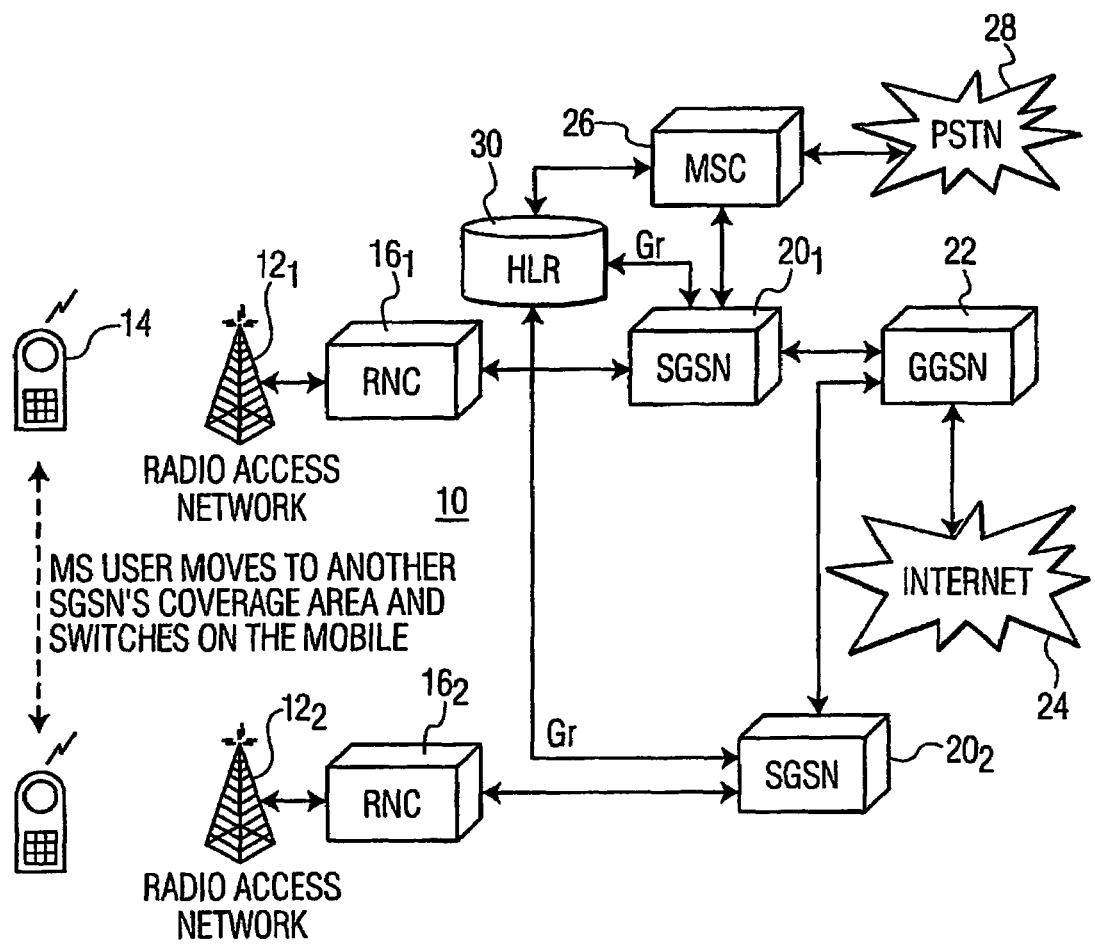
FIG. 1 depicts a block schematic diagram of an illustrative embodiment of a wireless telephony network for practicing the principles of the present invention.

FIG. 1 depicts a block schematic diagram of a wireless telephony network 10 having an architecture as proposed in the UMTS 3GPP standard. The wireless telephony network 10 includes at least one, and preferably, a plurality of radio access networks, illustratively shown as radio access networks $12_1$ and $12_2$. In the UMTS radio access networks comprising of a Node B and a Radio Network Controllers (RNC), the UMTS Node B, serves as the point of access for a mobile wireless terminal 14 seeking to connect with (attach itself to) the network 10. Radio Network Controllers (RNCs) $16_1$ and $16_2$ each control a separate one of the radio access networks $12_1$ and $12_2$, respectively, for the purpose of allocating the necessary resources in each network.

Each of the RNCs $16_1$ and $16_2$ connects to a corresponding one of Serving GPRS Support Nodes (SGSNs) $20_1$ and $20_2$, respectively, that comprise part of the core of the wireless telephony network 10. Each SGSN manages packet and voice services for the subscribers on a corresponding radio access network. Each SGSN has a link to a Gateway GPRS Node (SGSN) 22 that serves as an interface to the Internet 24 for packet service. In a similar fashion, the SGSN $20_1$ connects to a Mobile Switching Center (MSC) 26 that interfaces to the Public Switched Telephone Network (PSTN) 28 for voice services. A similar MSC (not shown) interfaces the SGSN $20_2$ to the PSTN 28.

Within the wireless telephony network 10, there exists at least one register (database) 30, typically known as the Home Location Register or HLR. The HLR 30 contains packet domain subscription data and location information that identifies which SGSN serves a particular subscriber. Each of the SGSNs $20_1$ and $20_2$ accesses the HLR 30 via a separate Gr interface, whereas the GGSN 22 accesses the HLR via a Gc interface. In accordance with the present principles, the HLR 30 stores the International Mobile Station Identity (IMSI) and a temporary identity (P-TMSI) for each mobile wireless terminal 14 previously attached to the wireless telephony network 10. Additionally, the HLR 30 stores the identity (i.e., the address) of each SGSN, the address of the SGSN currently attached to the mobile wireless terminal 14, as well as the address of the last visited SGSN if the terminal is currently detached. For a roaming mobile wireless terminal 14 not resident in the wireless telephony network 10, the HLR associated with that terminal will reside in a different wireless telephony network, accessible through the Internet 24 or a private line (not shown).

Figure 2:
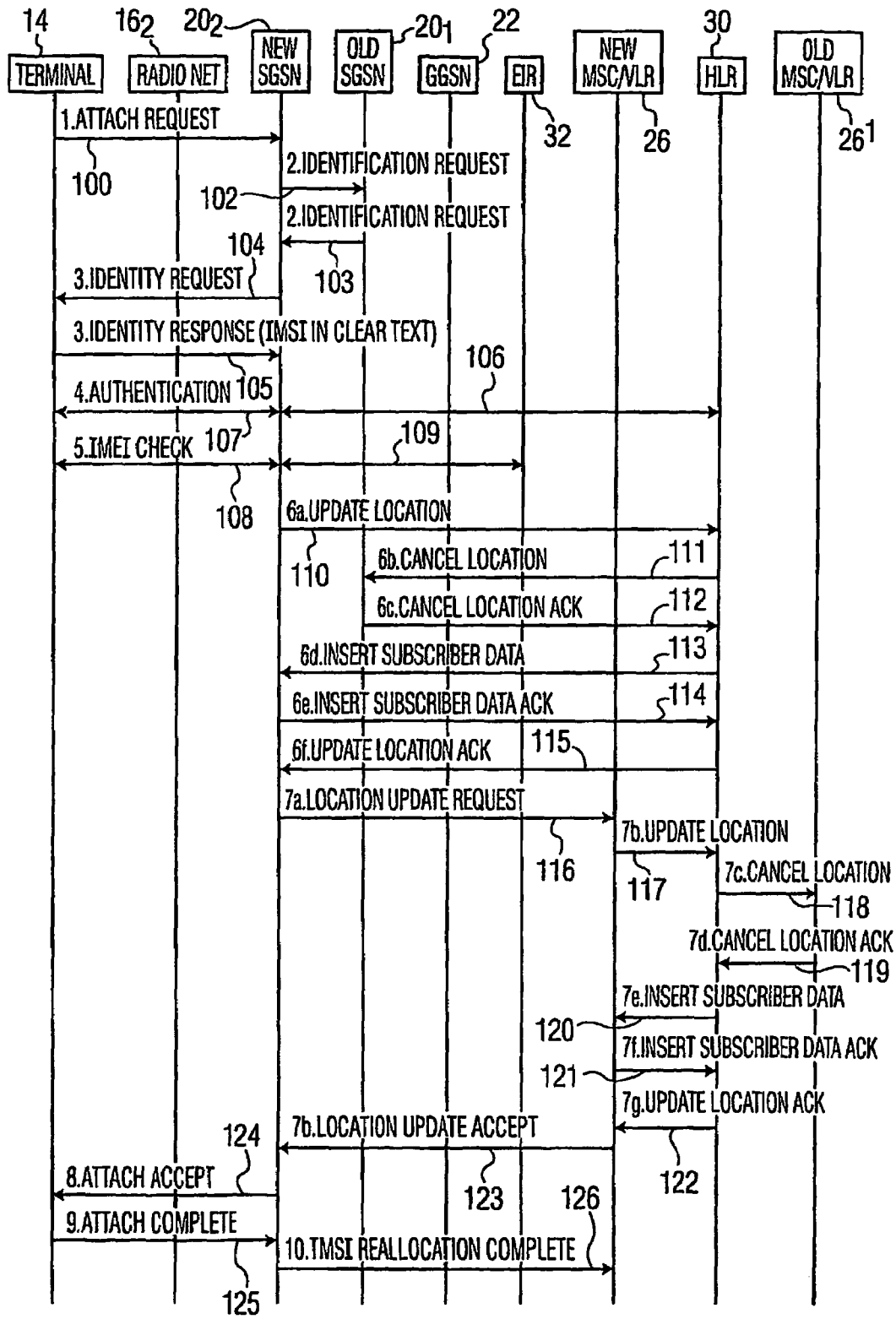
FIG. 2 depicts a chart illustrating the steps of a prior art procedure whereby a mobile wireless terminal attaches itself to the network of FIG. 1.

In order to better understand the advantage obtained by the attachment technique of the present principles, a description will first be provided of the current attachment technique depicted in FIG. 2. Upon moving from the coverage area of one radio access network to another, a mobile wireless terminal 14 makes an attachment request of the new SGSN serving the newly access radio access network during step 100 of FIG. 2. For purposes of illustration, assume that the mobile wireless terminal 14 seeks attachment through the radio access network $12_2$ of FIG. 1. Thus, the mobile wireless terminal 14 initiates the attachment process by making the attachment request to the SGSN $20_2$, hereinafter referred to as the "new" SGSN. Should the new SGSN $20_2$ have no identity information for the mobile wireless terminal 14, the new SGSN forwards the attachment request during step 102 of FIG. 2 to the "old" SGSN (e.g., SGSN $20_1$ of FIG. 1). If the old SGSN $20_1$ no longer retains any identity information for the mobile wireless terminal 14, the new SGSN will receive an identity response during step 103 of FIG. 2 indicating that the old SGSN lacks knowledge of the mobile wireless terminal 14.

Upon receiving an indication from the old SGSN $20_1$ that mobile wireless terminal 14 remains unknown, the new SGSN $20_2$ sends the mobile terminal an identity request during step 104 of FIG. 2. If unknown to both the SGSNs $20_1$ and $20_2$, the mobile wireless terminal 14 cannot simply send its P-TMSI to identify itself. Instead, the mobile wireless terminal 14 must respond to the identity request by sending its permanent identity (i.e., its IMSI) in clear text during step 105 of FIG. 2 to the new SGSN $20_2$. Sending the IMSI in clear text incurs the risk of interception and fraudulent misuse of the subscriber's identity.

After receiving the IMSI, the new SGSN $20_2$ authenticates the mobile wireless terminal 14 by querying the HLR 30 of FIG. 1 during step 106 of FIG. 2. Upon receiving a positive authentication response from the HLR 30, the new SGSN $20_2$ provides a positive verification response to the mobile wireless terminal 14 during step 107. Thereafter, the mobile wireless terminal 14 send an International Mobile Equipment Identity (IMEI) request to the new SGSN $20_2$ during step 108 of FIG. 2 to initiate an update of the terminal's location, as well as to verify the status of the terminal. Following receipt of the IMEI check request, the new SGSN $20_2$ queries an Equipment Identity Register 32 of FIG. 2 during step 109 to verify whether the mobile wireless terminal 14 is legitimate as opposed to having been stolen. Upon finding that mobile wireless terminal 14 legitimate during step 109, the new SGSN $20_2$ sends a message to the HLR 30 during step 110 to update the location of the terminal.

In response to the terminal location update information, the HLR 30 sends a request to the old SGSN $20_1$ during step 111 to cancel the location information stored therein for the mobile wireless terminal 14. The old SGSN $20_1$ responds with a cancel location acknowledgement during step 112. During step 113, the HLR 30 inserts into the new SGSN $20_2$ subscriber data associated with the mobile wireless terminal 14 that has now attached itself to this SGSN. The new SGSN $20_2$ responds by an Insert Subscriber Data Acknowledgement message during step 114. After step 114, the HLR 30 responds to the new SGSN $20_2$ with an Update Location Acknowledgement message during step 115 of FIG. 2.

In addition to updating the HLR 30, the new SGSN $20_2$ also makes update request to a Visiting Location Register (VLR) (not shown) in the MSC 26 of FIG. 1 during step 116 since the new SGSN $20_2$ is served by a different MSC than the old SGSN $20_1$. Upon receiving such a request, the new MSC/VLR 26 makes a request during step 117 to update the HLR 30. In turn, the HLR 30 sends a cancellation command during step 118 to the old MSC/VLR (designated as MSC 26' of FIG. 2) to indicate attachment of the mobile wireless terminal to the new SGSN $20_2$. The old MSC 26' of FIG. 2 responds with an Acknowledgement message during step 119.

Next, the HLR 30 inserts into the new MSC/VLR 26 updated subscriber data during step 120. The new MSC 26 responds with an Insert Subscriber Data Acknowledgement message during step 122. The new MSC/VLR 26 of FIG. 2 then sends a Location Update Acceptance message to the new SGSN $20_2$ during step 123, triggering transmission of an Attach Acceptance message from the new SGSN to the mobile wireless terminal 14 during step 124. The mobile wireless terminal 14 responds with an 'Attach Complete' message during step 125, followed by a TMSI Reallocation Complete Message from the new SGSN $20_2$ to the new MSC/VLR 26 during step 126 to indicate completion of the task of reallocating the TMSI mapping from the old to the new SGSN.

Figure 3:
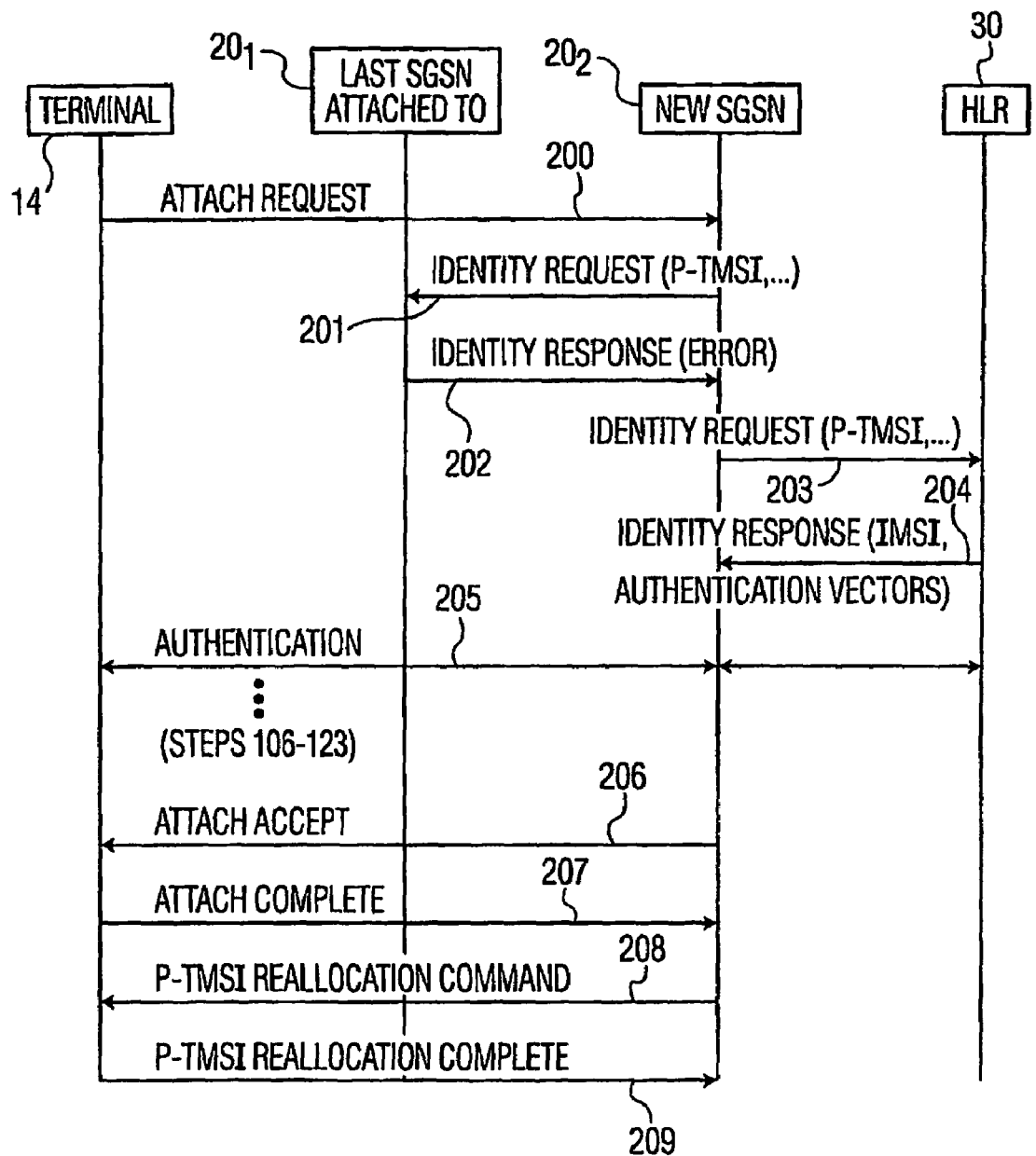
FIG. 3 depicts a chart illustrating the steps of a procedure whereby a mobile wireless terminal attaches itself to the network of FIG. 1 in accordance with the present principles.

The prior art attachment process of FIG. 2 incurs the disadvantage of requiring the mobile wireless terminal 14 transmit its IMSI in clear text when the old SGSN $20_1$ and the new SGSN $20_2$ both fail to recognize the terminal. The attachment technique of the present principles, best illustrated in FIG. 3, overcomes this disadvantage by storing subscriber identity information in the HLR 30. Storing such information in the HLR 30 enables identification of the mobile wireless terminal 14 in the event neither the old nor new SGSN recognizes the terminal. Referring to FIG. 3, the attachment technique of the present principles commences when the mobile wireless terminal 14 sends an 'Attach Request' message to the new SGSN $20_2$ during step 200 following a transition of the terminal to the radio access network $12_2$ of FIG. 1. Upon receipt of the 'Attach Request' message during step 200 of FIG. 3, the new SGSN $20_2$ sends an Identity Request message to the old SGSN $20_1$ during step 202 to identify the mobile wireless terminal 14. Absent knowledge of the mobile wireless terminal 14 having been attached, the old SGSN $20_1$ will send the new SGSN $20_1$ an Identity Response message during step 202 indicating an error.

In the past, when the old SGSN $20_1$ lacked knowledge of a previous attachment of the mobile wireless terminal 14, the terminal needed to send its permanent identity in clear text to identify itself. To avoid this disadvantage, the present attachment method does not make a request of the mobile wireless terminal 14 under such circumstances. Rather, as depicted in FIG. 3, the new SGSN $20_2$ sends an Identity Request message to the HLR register 30 during step 203 after receiving an error message during step 202. In accordance with the present principles, the HLR 30 stores the temporary identity (i.e., the P-TMSI) and permanent identity (IMSI) of each mobile wireless terminal 14 previously attached to the wireless telephony network 10. Thus, upon receipt of the Identity Request message during step 203, the HLR 30 provides the new SGSN $20_2$ an Identity Response message during step 204. This message includes the IMSI of the mobile wireless terminal 14, and the associated authentication vectors needed to verify the terminal. During step 205, authentication of the mobile wireless terminal 14 occurs. Typically, such authentication occurs in the same manner as during steps 10–123 of FIG. 2.

Following authentication, the new SGSN $20_2$ sends an Attach Acceptance message to the mobile wireless terminal 14 during step 206 of FIG. 3. In response, the mobile wireless terminal 14 sends an 'Attach Complete' acknowledgement message during step 207. During step 208, the new SGSN $20_2$ can reallocate the P-TMSI by sending a P-TMSI reallocation command to the mobile wireless terminal 14. Upon completion of reallocation of the P-TMSI, the mobile wireless terminal 14 sends a P-TMSI reallocation complete acknowledgement to the new SGSN $20_2$ during step 209.

The applicable GPRS and UMTS standards provide that the SGSN may reallocate the P-TMSI at any time. Such reallocation can occur during a P-TMSI Reallocation procedure, or as part of the 'Attach' or 'Routing Area Update' procedures. Updating the HLR 30 each time one of the SGSNs reallocates the P-TMSI could consume significant resources. Instead, HLR updating should be done upon receipt of a P-TMSI and P-TMSI signature from a SGSN only at the time of detachment, i.e. only at the time the last P-TMSI and P-TMSI signature are stored in the HLR 30. When a SGSN issues a new P-TMSI to a mobile wireless terminal 14 to replace the old P-TMSI, the SGSN waits for an acknowledgement before removing the old P-TMSI and using the new one.

In practice, the wireless telephony network 10 of FIG. 1 considers the old P-TMSI as invalid upon receipt of the P-TMSI Reallocation Complete acknowledgement message. If, for some reason, the SGSN receives no acknowledgement, and the mobile wireless terminal becomes detached, the SGSN will store both old and new P-TMSI for that terminal. Two proposed solutions address this problem:

Solution 1

The Mobile Wireless Terminal 14 Initiates Detachment

To detach itself from the wireless telephony network 10 of FIG. 1, the mobile wireless terminal 14 sends a Detach Request message (Detach Type, P-TMSI, P-TMSI Signature, Switch Off) to its corresponding SGSN. In accordance with this proposed solution, the mobile wireless terminal 14 will include its old P-TMSI in the Detach Request message. In this way, the SGSN will know which P-TMSI to store in the HLR 30.

The Wireless Telephony Network 10 Initiates Detachment

To initiate detachment, the SGSN sends a Detach Request message to the mobile wireless terminal 14. In response, the mobile wireless terminal 14 sends a Detach Accept message to the SGSN. However, with a network-initiated detachment, no P-TMSI exchange occurs upon receipt of the request or acceptance messages to remove the P-TMSI ambiguity. The UMTS 3GPP standard does not discuss P-TMSI reallocation and the possibility of a network-initiated detachment collision. Typically, the wireless telephony network 10 can wait until transmission of a P-TMSI Reallocation Completion acknowledgement message from the mobile wireless terminal 14 to the SGSN. The mobile wireless terminal 14 will then send the Detach Request message to the wireless telephony network 10 to avoid ambiguity when the terminal powers up again. In such an instance, the SGSN stores the new P-TMSI in the HLR 30.

Solution 2

Another proposed solution would require the SGSN to send both old and new P-TMSI to the HLR 30. Thus, at the time of attachment, the HLR 30, when queried by a new SGSN, can map whichever P-TMSI is sent by mobile wireless terminal 14 to the stored IMSI.

The foregoing describes a technique for protecting the identity of a mobile wireless terminal during attachment to a wireless telephony network.

The invention claimed is:

1. A method for protecting the identity of a mobile wireless terminal during attachment to a wireless network, comprising the steps of:

receiving in the network a request for access from a mobile wireless terminal previously registered with the network;

querying at least one Serving GPRS Support Node (SGSN) in the wireless network to recognize the mobile wireless terminal in accordance with a temporary identity contained in the access request, but if no Serving GPRS Support Node (SGSN) recognizes the mobile wireless terminal, then launching a query from the one Serving GPRS Support Node (SGSN) to a register in the wireless network storing identity information of previously registered mobile wireless terminals to identify the mobile wireless terminal from its temporary identity; and sending an identification response in the form of at least permanent identity information from the register to the at least one Serving GPRS Support Node (SGSN) to identify the mobile wireless terminal.

2. The method according to claim 1 further comprising the step of updating the register each time the temporary identity of the mobile wireless terminal is allocated (including allocation the very first time and reallocation).

3. The method according to claim 1 further comprising the step of updating the register at detachment of the mobile wireless terminal from the wireless telephony network.

4. The method according to claim 3 wherein the at least one Serving GPRS Support Node (SGSN) discards a stored temporary identity for the mobile wireless terminal upon receipt of a detachment request and an acknowledgement from the terminal.

5. The method according to claim 4 further comprising the step of storing in the at least one Serving GPRS Support Node (SGSN) a temporary identity contained in the detachment request when the mobile wireless terminal initiates detachment.

6. The method according to claim 3 further comprising the step of storing a new temporary identity for the mobile wireless terminal following temporary identity reallocation when the wireless telephony network initiates detachment of the mobile wireless terminal.

7. The method according to claim 1 further comprising the step of storing both new and old temporary identities for the mobile wireless terminal in the register following a temporary identity relocation.

8. A wireless network for protecting the identity of a mobile wireless terminal during attachment, comprising:
- at least one Serving GPRS Support Node (SGSN) for receiving a request for access from a mobile wireless terminal previously registered with the network and for identifying the mobile wireless terminal in accordance with a temporary identity contained in the access request when the Serving GPRS Support Node (SGSN) has knowledge of the mobile wireless terminal; and
- a register in the wireless network storing permanent identity information of previously registered mobile wireless terminals to identify the mobile wireless terminal from its temporary identity using its permanent identity information in response to a query from the at least one Serving GPRS Support Node (SGSN) when the one Serving GPRS Support Node (SGSN) lacks knowledge of the mobile wireless terminal.

9. The network according to claim 8 wherein the register is updated each time the temporary identity of the mobile wireless terminal is allocated.

10. The network according to claim 8 wherein the register undergoes updating at detachment of the mobile wireless terminal from the wireless telephony network.

11. The network according to claim 10 wherein the at least one Serving GPRS Support Node (SGSN) discards a stored temporary identity for the mobile wireless terminal upon receipt of a detachment request and an acknowledgement from the mobile wireless terminal.

12. The network according to claim 11 wherein the at least one Serving GPRS Support Node (SGSN) stores a temporary identity contained in the detachment request when the mobile wireless terminal initiates detachment.

13. The network according to claim 12 wherein the at least one Serving GPRS Support Node (SGSN) stores a new temporary identity for the mobile wireless terminal following temporary identity reallocation when the wireless telephony network initiates detachment of the mobile wireless terminal.

14. The network according to claim 8 wherein the register stores both new and old temporary identities for the mobile wireless terminal following a temporary identity reallocation.

* * * * *